(12) United States Patent
Severin et al.

(10) Patent No.: US 8,763,393 B2
(45) Date of Patent: Jul. 1, 2014

(54) SEALING ARRANGEMENT BETWEEN A VARIABLE-NOZZLE ASSEMBLY AND A TURBINE HOUSING OF A TURBOCHARGER

(75) Inventors: Emmanuel Severin, Thaon les Vosges (FR); Pierre Barthelet, Thaon les Vosges (FR); Lionel Toussaint, Gerardmer Vosges (FR); Olivier Millotte, Gerardmer Vosges (FR)

(73) Assignee: Honeywell International Inc., Morristown, NJ (US)

( * ) Notice: Subject to any disclaimer, the term of this patent is extended or adjusted under 35 U.S.C. 154(b) by 400 days.

(21) Appl. No.: 13/205,330

(22) Filed: Aug. 8, 2011

(65) Prior Publication Data

US 2013/0036733 A1     Feb. 14, 2013

(51) Int. Cl.
| | |
|---|---|
| F02B 33/44 | (2006.01) |
| F02B 37/24 | (2006.01) |
| F02C 6/12 | (2006.01) |
| F01D 17/16 | (2006.01) |
| F02B 37/22 | (2006.01) |
| F02D 41/00 | (2006.01) |
| F01D 9/04 | (2006.01) |
| B23P 15/00 | (2006.01) |

(52) U.S. Cl.
CPC .................. *F02B 37/24* (2013.01); *F02B 37/22* (2013.01); *F01D 17/165* (2013.01); *F02C 6/12* (2013.01); *F02D 41/0007* (2013.01); *F05D 2220/40* (2013.01); *F01D 9/04* (2013.01); *B23P 15/006* (2013.01)
USPC ............. 60/602; 415/158; 415/159; 415/163; 415/164

(58) Field of Classification Search
CPC ........ F02B 37/22; F02B 37/24; F01D 17/165; F02C 6/12; F02D 41/0007; F05D 2220/40; F01D 9/04; B23P 15/006
USPC ............ 60/602; 415/159–165, 204; 29/889.2, 29/889.22
IPC .................................. F02B 17/16, 37/22, 37/24
See application file for complete search history.

(56) References Cited

U.S. PATENT DOCUMENTS

| | | | |
|---|---|---|---|
| 4,770,603 A | * | 9/1988 | Engels et al. ................. 415/164 |
| 7,351,042 B2 | | 4/2008 | Jinnai et al. ..................... 60/602 |

(Continued)

FOREIGN PATENT DOCUMENTS

| | | | | |
|---|---|---|---|---|
| EP | 2 243 939 A1 | 10/2010 | | |
| EP | 2278127 A2 | * 1/2011 | ................ F02C 6/12 |

(Continued)

*Primary Examiner* — Thai Ba Trieu
(74) *Attorney, Agent, or Firm* — Alston & Bird LLP (57) ABSTRACT

A turbocharger includes a variable-nozzle assembly that includes an insert having a tubular portion received into a stepped bore of a turbine housing and having a nozzle portion extending radially out from one end of the tubular portion, and a generally annular nozzle ring axially spaced from the nozzle portion and an array of vanes rotatably mounted to the nozzle ring. Sealing of the interface between the tubular portion of the insert and the turbine housing is provided by a sealing ring formed as a generally annular body having a U- or V-shaped cross-section oriented such that an open side of the U- or V-shaped cross-section faces in a radial direction. The U- or V-shaped cross-section defines two opposing legs, one of the legs being engaged against an end face of the tubular portion of the insert and the other leg being engaged against an upstream-facing step surface of the turbine housing bore.

7 Claims, 5 Drawing Sheets

(56) References Cited

U.S. PATENT DOCUMENTS

| | | | | |
|---|---|---|---|---|
| 7,559,199 B2* | 7/2009 | Sausse et al. | | 415/164 |
| 7,918,023 B2* | 4/2011 | Sausse et al. | | 29/889.2 |
| 7,946,116 B2* | 5/2011 | Sausse et al. | | 60/602 |
| 8,033,109 B2* | 10/2011 | Sausse et al. | | 60/602 |
| 8,056,336 B2* | 11/2011 | Arnold et al. | | 60/602 |
| 8,545,172 B2* | 10/2013 | Severin et al. | | 415/164 |
| 2007/0113550 A1* | 5/2007 | Sausee et al. | | 60/605.1 |
| 2007/0130943 A1* | 6/2007 | Sausse et al. | | 60/602 |
| 2008/0075582 A1* | 3/2008 | Sausse et al. | | 415/159 |
| 2008/0193281 A1* | 8/2008 | Sausse et al. | | 415/158 |
| 2008/0260520 A1* | 10/2008 | Hettinger et al. | | 415/163 |
| 2009/0092483 A1* | 4/2009 | Yasui et al. | | 415/159 |
| 2009/0249785 A1* | 10/2009 | Sausse et al. | | 60/602 |
| 2009/0272112 A1* | 11/2009 | Arnold et al. | | 60/602 |
| 2010/0166541 A1* | 7/2010 | Hausser et al. | | 415/148 |
| 2011/0167817 A1* | 7/2011 | Sausse et al. | | 60/602 |
| 2011/0283698 A1* | 11/2011 | Sausse et al. | | 60/605.1 |

FOREIGN PATENT DOCUMENTS

| | | | | |
|---|---|---|---|---|
| EP | 2199570 B1 | * | 7/2011 | F02C 6/12 |
| JP | 2006125588 A | * | 5/2006 | F02B 37/24 |

* cited by examiner

SEALING ARRANGEMENT BETWEEN A VARIABLE-NOZZLE ASSEMBLY AND A TURBINE HOUSING OF A TURBOCHARGER

BACKGROUND OF THE INVENTION

The present disclosure relates to exhaust gas-driven turbochargers having a variable-nozzle assembly for the turbine, in which the assembly includes a tubular member that is received in a bore of the turbine housing, with a sealing arrangement for sealing between the tubular member and the turbine housing so as to substantially prevent exhaust gas from leaking and circumventing the variable nozzle and turbine wheel.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is an intermediate housing connected between the turbine and compressor housings for containing bearings for the shaft. The turbine housing defines a generally annular chamber or volute that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective often is not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The variable vane mechanism is relatively complicated and thus presents a challenge in terms of assembly of the turbocharger. Furthermore, the mechanism is located between the turbine housing, which gets quite hot because of its exposure to exhaust gases, and the center housing, which is at a much lower temperature than the turbine housing. Accordingly, the variable vane mechanism is subject to thermal stresses because of this temperature gradient.

The assignee of the present application has previously addressed the issues noted above by providing a variable-nozzle turbocharger that includes a cartridge containing the variable vane mechanism. The turbine defines a nozzle through which exhaust gas is delivered to the turbine wheel, and a central bore through which exhaust gas is discharged after it passes through the turbine wheel. The cartridge is connected between the center housing and the turbine housing and comprises an assembly of a generally annular nozzle ring and an array of vanes circumferentially spaced about the nozzle ring and rotatably mounted to the nozzle ring and connected to a rotatable actuator ring such that rotation of the actuator ring rotates the vanes for regulating exhaust gas flow to the turbine wheel. The cartridge also includes an insert having a tubular portion received into the bore of the turbine housing. The insert further includes a nozzle portion that extends generally radially out from one end of the tubular portion and, together with the opposing nozzle ring, defines the nozzle through which exhaust gas flows to the turbine wheel. The vanes extend between the nozzle ring and the nozzle portion. Sealing between the tubular portion of the insert and the turbine housing is accomplished by one or more piston rings carried in grooves formed in the radially outer surface of the tubular portion. The inner surface of the turbine housing bore is engaged by the piston ring(s), thereby discouraging exhaust gas from leaking through the inevitable gap that exists between the tubular portion and the turbine housing. Such leakage of exhaust gas impairs turbocharger performance because the leaking exhaust gas does not pass through the turbine wheel and thus does not contribute toward boosting of the engine intake air.

While the above-described turbocharger functions well, further improvements are sought.

BRIEF SUMMARY OF THE DISCLOSURE

The present disclosure relates to a turbocharger having a variable-nozzle turbine. In accordance with one embodiment of the invention, the turbocharger includes a turbine comprising a turbine housing and a turbine wheel mounted in the turbine housing and connected to a rotatable shaft for rotation therewith, a compressor comprising a compressor housing and a compressor wheel mounted in the compressor housing and connected to the rotatable shaft for rotation therewith, and a center housing connected between the compressor housing and the turbine housing. The turbocharger also includes a variable-nozzle assembly comprising an insert having a tubular portion that is received into a bore of the turbine housing and having a nozzle portion extending generally radially out from one end of the tubular portion, and a generally annular nozzle ring axially spaced from the nozzle portion and an array of vanes circumferentially spaced about the nozzle ring and rotatably mounted to the nozzle ring such that the vanes are variable in setting angle for regulating exhaust gas flow to the turbine wheel. Sealing of the interface between the tubular portion of the insert and the turbine housing is provided by a sealing ring as further described below.

In particular, the bore of the turbine housing is stepped such that, for a predetermined distance from an upstream end of the bore axially toward an opposite downstream end of the bore, the bore has a first inside diameter, and the bore then is abruptly reduced to a smaller second inside diameter so as to define a step having an axially upstream-facing step surface. The sealing ring is disposed between an end face of the tubular portion of the insert and the upstream-facing step surface of the bore. The sealing ring is a generally annular body having a generally U- or V-shaped cross-section oriented such that an open side of the U- or V-shaped cross-section faces in a radial direction (advantageously, radially outwardly). The U- or V-shaped cross-section defines two opposing legs, one of the legs being engaged against the end face of the tubular portion of the insert and the other leg being engaged against the upstream-facing surface of the bore.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
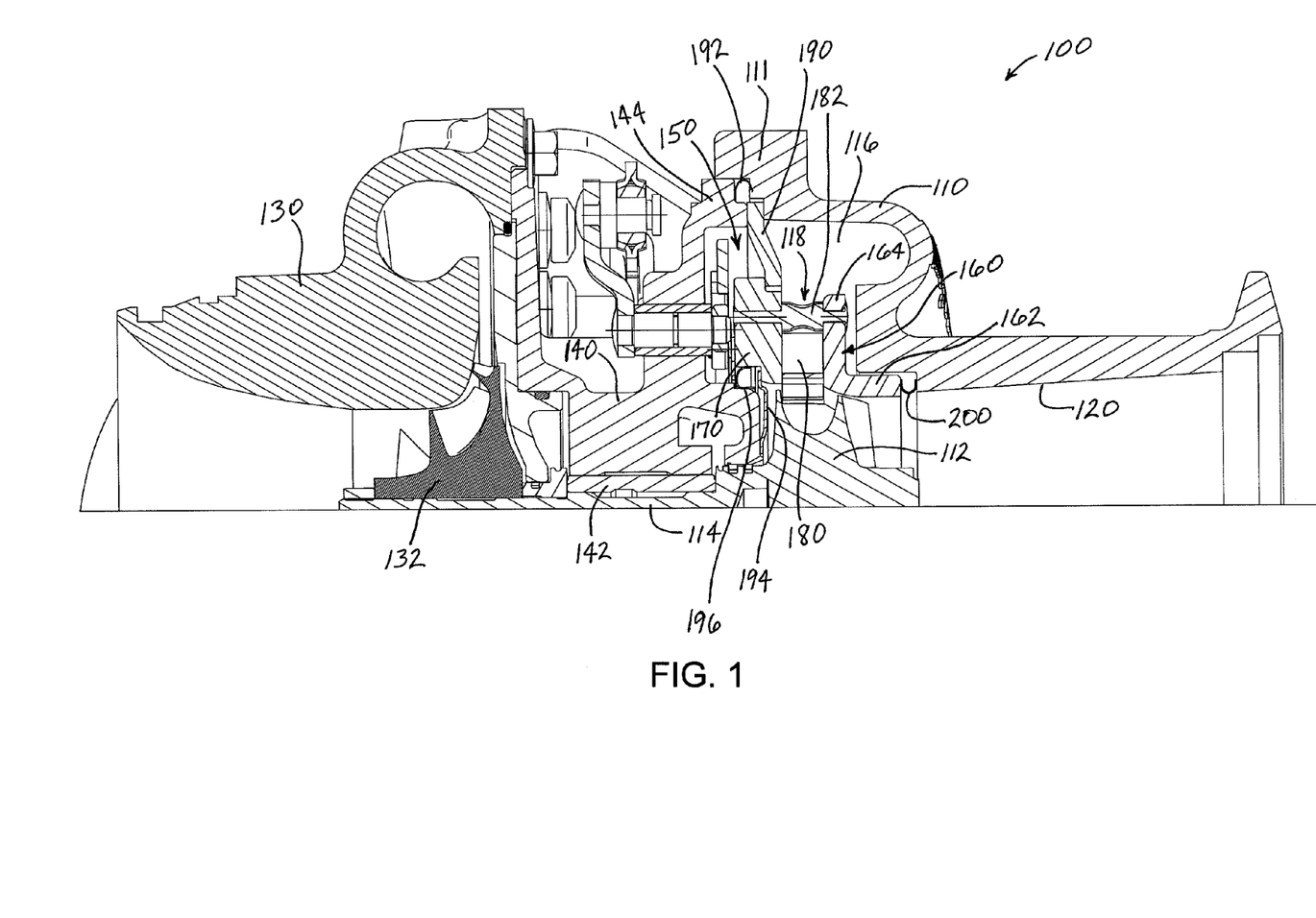
FIG. 1 is an axial cross-sectional view of a turbocharger in accordance with an embodiment of the invention.

A turbocharger 100 in accordance with one embodiment of the invention is shown in FIG. 1. The turbocharger includes a turbine comprising a turbine housing 110 and a turbine wheel 112 mounted in the turbine housing and connected to a rotatable shaft 114 for rotation therewith. The turbine housing defines a chamber 116 surrounding the turbine wheel for receiving exhaust gas, and there is a nozzle 118 leading from the chamber generally radially inwardly to the turbine wheel. The turbine housing also defines an axially extending bore 120 through which exhaust gas is discharged after passing through the turbine wheel.

The turbocharger further comprises a compressor comprising a compressor housing 130 and a compressor wheel 132 mounted in the compressor housing and connected to the rotatable shaft 114 for rotation therewith. A center housing 140 is connected between the compressor housing 130 and the turbine housing 110. The shaft 114 passes through the center housing, which supports bearings 142 for the shaft.

The turbocharger further comprises a variable-nozzle assembly 150 that includes an insert 160 having a tubular portion 162 received into the bore 120 of the turbine housing and having a generally annular nozzle portion 164 extending generally radially out from one end of the tubular portion. The variable-nozzle assembly 150 also includes a generally annular nozzle ring 170 axially spaced from the nozzle portion 164, and an array of vanes 180 circumferentially spaced about the nozzle ring and rotatably mounted to the nozzle ring such that the vanes are variable in setting angle for regulating exhaust gas flow to the turbine wheel. The nozzle ring 170 is rigidly affixed to the nozzle portion 164, such as by rigid spacers 182 that extend between these parts and maintain a fixed spacing between them.

The turbine housing 110 includes a generally ring-shaped flange 111 that opposes a flange 144 of the center housing 140. The turbine housing flange 111 and center housing flange 144 have opposing axially facing surfaces that are stepped such that there is a radially outer pair of opposing surfaces and a radially inner pair of opposing surfaces. A radially outer portion of a generally annular retainer ring 190 is disposed and clamped between the inner pair of opposing surfaces. A resilient sealing ring 192 is disposed and axially compressed between the outer pair of opposing surfaces. In the illustrated embodiment, the sealing ring 192 has a generally U-shaped cross-section oriented such that an open side of the U faces radially inwardly. However, other configurations of sealing ring can be used. A radially inner portion of the retainer ring 190 engages an axially downstream-facing surface of the nozzle ring 170 and thereby limits the extent to which the nozzle ring 170 can move axially in the downstream direction (i.e., to the right in FIG. 1).

A spring element 194, which in the illustrated embodiment also comprises a heat shield, is disposed between a radially inner portion of the nozzle ring 170 and a portion of the center housing 140. The heat shield 194 is a sheet metal part constructed of a resilient metal, and the heat shield has a non-flat configuration such that the heat shield acts as a spring element when axially compressed. The heat shield is generally annular and has a radially outer portion engaged against an axially upstream-facing surface of the nozzle ring 170 and a radially inner portion engaged against an axially downstream-facing surface of the center housing 140. The heat shield is axially compressed between these surfaces.

A resilient radially-compressible locator ring 196 is disposed between a radially inward-facing surface of the nozzle ring 170 and a radially outward-facing surface of the center housing 140 and is engaged against the inward- and outward-facing surfaces so as to radially locate the nozzle ring with respect to the center housing. The locator ring comprises a generally annular body having a generally C-shaped cross-section that defines a radially outer leg and a radially inner leg, the radially outer leg engaged against the radially inward-facing surface of the nozzle ring 170 and the radially inner leg engaged against the radially outward-facing surface of the center housing 140.

Figure 1A:
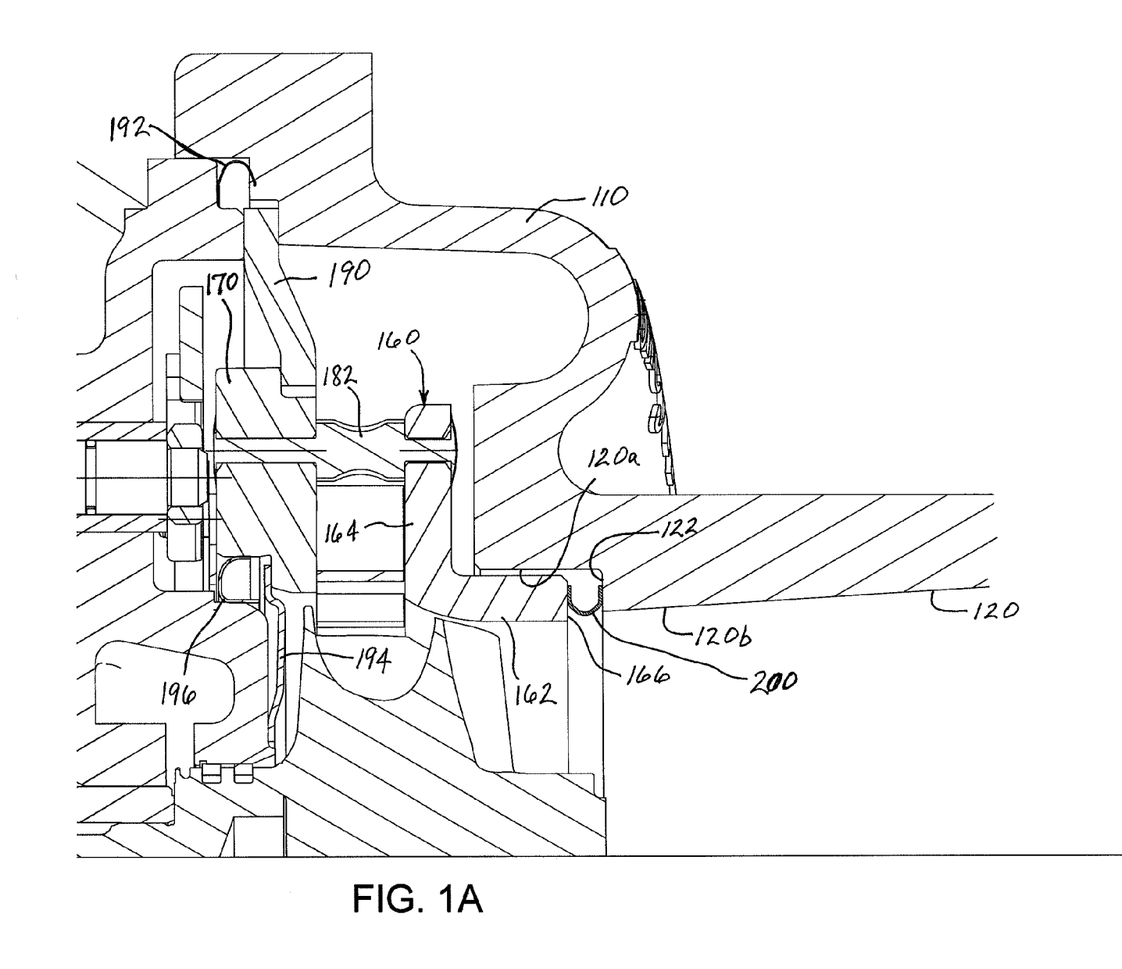
FIG. 1A is a magnified portion of FIG. 1.

In accordance with the invention, sealing between the insert 160 and the turbine housing 110 is provided by a sealing ring 200. With reference to FIG. 1A, the bore 120 of the turbine housing is a stepped bore having a portion 120a of relatively larger inside diameter and a portion 120b of relatively smaller inside diameter. The larger-diameter portion 120a extends from the upstream end of the bore 120 axially toward the downstream end of the bore, for a predetermined distance, and the bore then abruptly diminishes in diameter to the smaller-diameter portion 120b, thereby creating a step having an axially upstream-facing step surface 122. The tubular portion 162 of the insert 160 has an end face 166 that faces axially downstream and opposes the step surface 122. The sealing ring 200 is disposed between the end face 166 and the step surface 122.

The sealing ring 210 comprises a generally annular body having a generally U- or V-shaped cross-section oriented such that an open side of the U- or V-shaped cross-section faces in a radial direction. The U- or V-shaped cross-section defines two opposing legs, one of the legs being engaged against the end face 166 of the tubular portion 162 of the insert 160 and the other leg being engaged against the step surface 122 of the bore 120. The sealing ring is resiliently deformable and is structured and arranged so as to be axially compressed between the end face 166 and the step surface 122. The U- or V-shaped cross-section of the ring 200 advantageously has the open side of the cross-section facing radially outwardly, so that the exhaust gas pressure differential that exists between the radially outer side of the ring and the radially inner side of the ring tends to act on the ring so as to spread the two legs of the cross-section apart, thereby urging the legs more firmly against the surfaces 166 and 122 and thus improving sealing.

The sealing ring 200 can be formed of a suitable metal by any suitable manufacturing process. As a non-limiting example, the sealing ring can be made from stainless steel by a stamping, roll-forming, and welding process, as is known for similar ring-shaped parts.

Sealing between the insert 160 and the turbine housing can be further augmented, if desired, by providing a piston ring carried by the tubular portion 162 of the insert, about its radially outer surface, for engaging an inner surface of the bore portion 120a.

Figure 2:
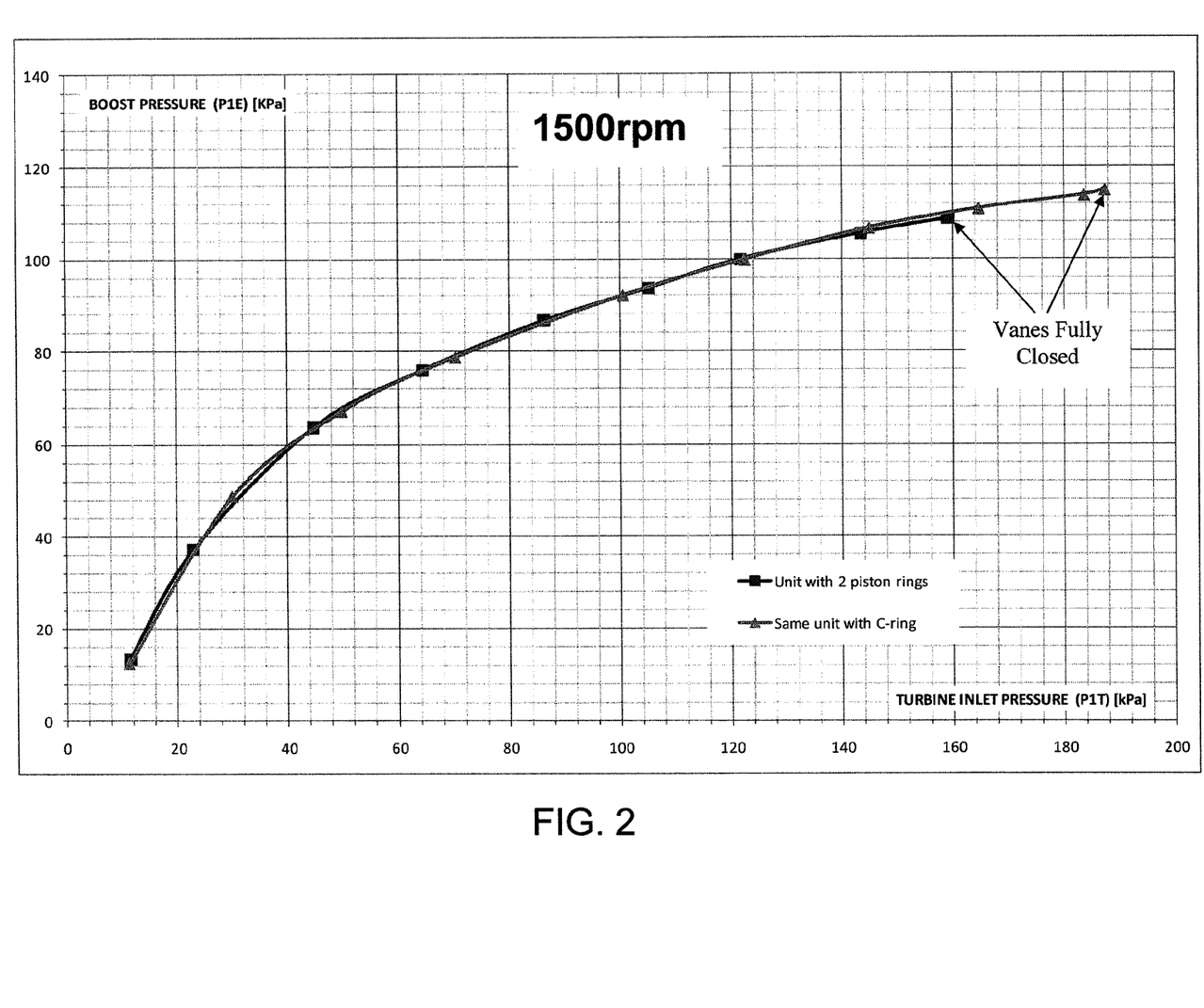
FIG. 2 is a graph showing results of testing an embodiment of the invention as well as a control turbocharger that does not embody the invention.
Figure 3:
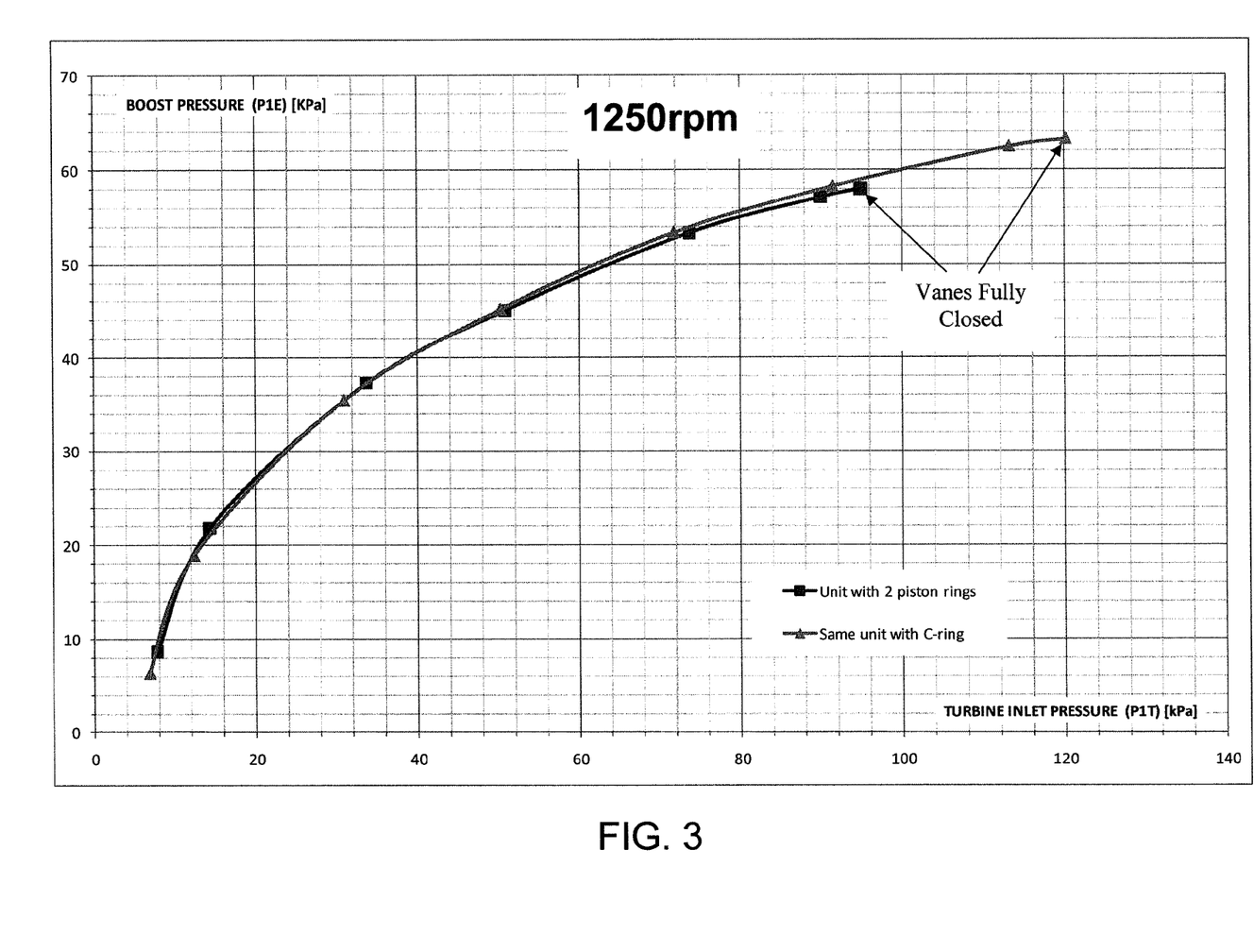
FIG. 3 is a graph showing further results of the testing.
Figure 4:
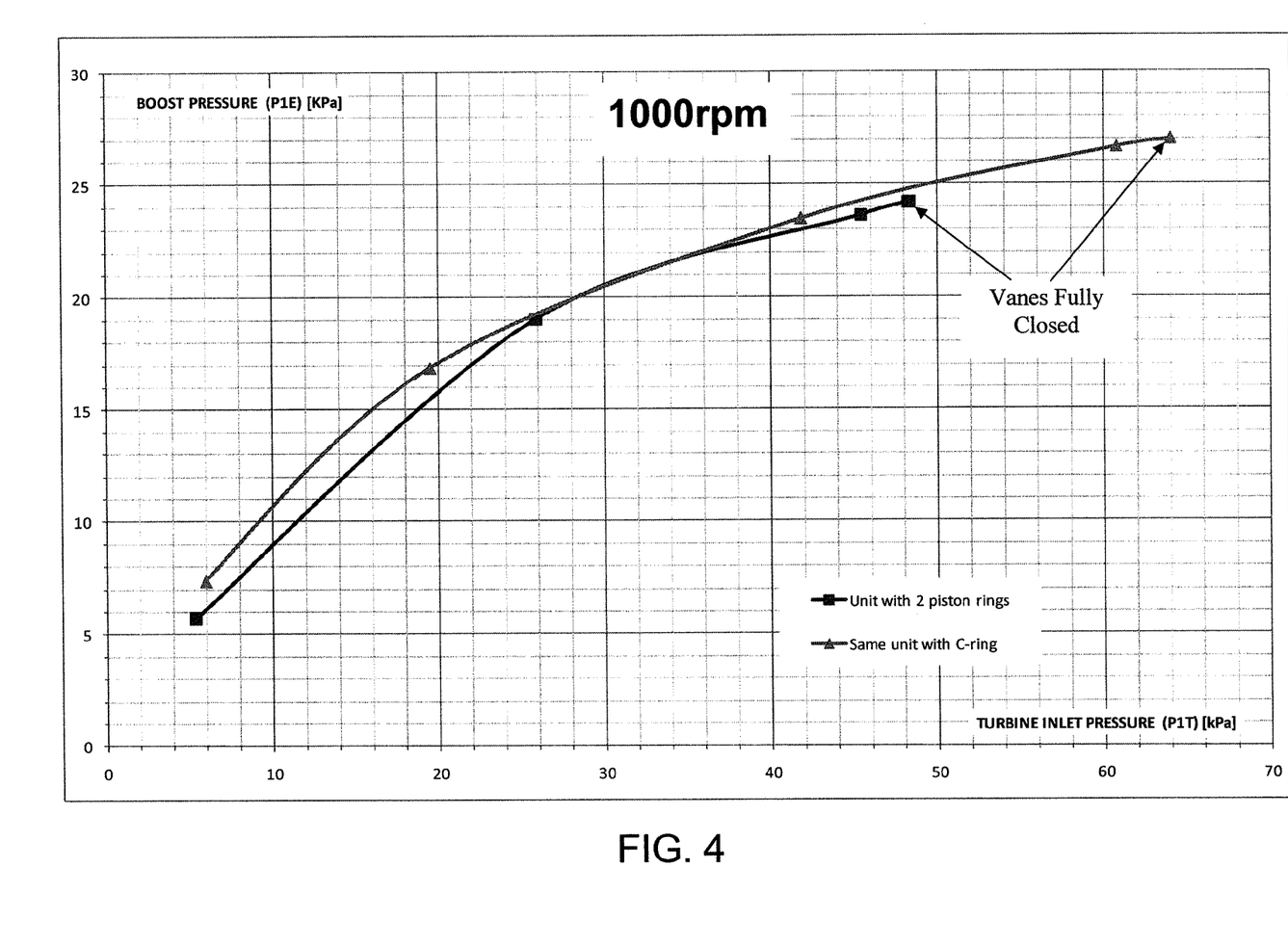
FIG. 4 is a graph showing still further results of the testing.

Tests were performed with a control turbocharger having two piston rings between the tubular portion of the insert and the turbine housing bore, but lacking a sealing ring in accordance with the invention, and the results were compared to test results for a turbocharger having a sealing ring such as the sealing ring 200 described above but having no piston rings between the tubular portion of the insert and the turbine housing bore. Results of the tests are summarized in FIGS. 2 through 4. FIG. 2 shows results of tests conducted at a constant engine speed of 1500 rpm in which the vanes of the variable-nozzle assembly were swept from a mid-open position to a fully closed position in stepwise increments. FIGS. 3 and 4 show the results of similar tests at 1250 and 1000 rpm, respectively.

Turbocharger boost pressure and turbine inlet pressure, among other parameters, were measured for each vane position. FIGS. 2-4 show boost pressure versus turbine inlet pressure. It can be seen that when the vanes were fully closed (represented by the data point at the far right of the plotted curve for each of the control and inventive turbochargers), the inventive turbocharger achieved a higher boost pressure at a higher turbine inlet pressure, relative to the control turbocharger. These results indicate that a greater amount of exhaust gas was passing through the turbine wheel of the inventive turbocharger relative to the control turbocharger. This is attributed to improved sealing between the variable-nozzle assembly and the turbine housing provided by the sealing ring, versus the sealing provided by the conventional twin piston ring arrangement.

A turbocharger assembly in accordance with the invention can be assembled by following these steps:
  providing a turbine housing 110 defining a chamber 116 for receiving exhaust gas from an engine, and an axially extending bore 120 through which exhaust gas is discharged from the turbine housing, the bore being stepped such that the bore has a first inside diameter for a predetermined distance from an upstream end of the bore axially toward an opposite downstream end of the bore, and the bore then is abruptly reduced to a smaller second inside diameter so as to define a step having an axially upstream-facing step surface 122;
  disposing a sealing ring 200 within the bore 120 against the step surface 122, the sealing ring comprising a generally annular body having a generally U- or V-shaped cross-section oriented such that an open side of the U- or V-shaped cross-section faces in a radial direction, the U- or V-shaped cross-section defining opposing first and second legs, the first leg being engaged against the step surface 122 of the bore and the second leg facing the upstream end of the bore, the sealing ring being resiliently deformable under axial compression;
  providing a variable-nozzle assembly 150 comprising an insert 160 having a tubular portion 162 sized to be received into the bore 120 of the turbine housing and having a nozzle portion 164 extending generally radially out from one end of the tubular portion 162, the variable-nozzle assembly further comprising a generally annular nozzle ring 170 axially spaced from the nozzle portion 164 and an array of vanes 180 circumferentially spaced about the nozzle ring 170 and rotatably mounted to the nozzle ring such that the vanes are variable in setting angle for regulating exhaust gas flow;
  inserting the tubular portion 162 of the insert 160 into the bore 120 until an end face 166 of the tubular portion contacts the second leg of the sealing ring 200; and
  fastening an assembly of a center housing 140 and a retainer ring 190 to the turbine housing 110 so as to capture the variable-nozzle assembly 150 therebetween in such a manner that the sealing ring 200 is axially compressed between the end face 166 of the tubular portion 162 of the insert 160 and the step surface 122 of the bore 120.

In one embodiment, the method further comprises the step of disposing a spring element 194 between the center housing assembly 140, 190 and the variable-nozzle assembly 150 in such a manner that the spring element 194 axially biases the variable-nozzle assembly 150 toward the sealing ring 200.

The method can also include the steps of providing a retainer ring 190 as part of the center housing assembly, and disposing the retainer ring 190 such that a radially outer portion of the retainer ring 190 is clamped between opposing flange surfaces of the center housing assembly and the turbine housing, and a radially inner portion of the retainer ring 190 engages an axially downstream-facing surface of the nozzle ring 170 to limit the extent to which the nozzle ring 170 can move axially in the downstream direction.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of assembling a turbocharger assembly, comprising the steps of:
  providing a turbine housing defining a chamber for receiving exhaust gas, and an axially extending bore through which exhaust gas is discharged from the turbine housing, the bore being stepped such that the bore has a first inside diameter for a predetermined distance from an upstream end of the bore axially toward an opposite downstream end of the bore, and the bore then is abruptly reduced to a smaller second inside diameter so as to define a step having an axially upstream-facing step surface;
  disposing a sealing ring within the bore against the step surface, the sealing ring comprising a generally annular body having a generally U- or V-shaped cross-section oriented such that an open side of the U- or V-shaped cross-section faces in a radial direction, the U- or V-shaped cross-section defining opposing first and second legs, the first leg being engaged against the step surface of the bore and the second leg facing the upstream end of the bore, the sealing ring being resiliently deformable under axial compression;

providing a variable-nozzle assembly comprising an insert having a tubular portion sized to be received into the bore of the turbine housing and having a nozzle portion extending generally radially out from one end of the tubular portion, the variable-nozzle assembly further comprising a generally annular nozzle ring axially spaced from the nozzle portion and an array of vanes circumferentially spaced about the nozzle ring and rotatably mounted to the nozzle ring such that the vanes are variable in setting angle for regulating exhaust gas flow;

inserting the tubular portion of the insert into the bore until an end face of the tubular portion contacts the second leg of the sealing ring;

fastening a center housing assembly to the turbine housing so as to capture the variable-nozzle assembly therebetween in such a manner that the sealing ring is axially compressed between the end face of the tubular portion of the insert and the step surface of the bore;

disposing a heat shield between the nozzle ring and the center housing such that the heat shield is compressed therebetween and such that the heat shield and the sealing ring exert axially oppositely directed biasing forces on the variable-nozzle assembly, wherein the heat shield comprises a sheet metal part that is generally annular and has a radially outer portion engaged against an axially upstream-facing surface of the nozzle ring and a radially inner portion engaged against an axially downstream-facing surface of the center housing; and providing a retainer ring having a radially outer portion engaged against an axially downstream-facing surface of the center housing and a radially inner portion engaged against an axially downstream-facing surface of the nozzle ring, the retainer ring urging the nozzle ring against the biasing force exerted by the heat shield.

2. A turbocharger comprising:

a turbine comprising a turbine housing and a turbine wheel mounted therein and connected to a rotatable shaft, the turbine housing defining a chamber surrounding the turbine wheel for receiving exhaust gas, and an axially extending bore through which exhaust gas is discharged after passing through the turbine wheel, the bore being stepped such that the bore has a first inside diameter for a predetermined distance from an upstream end of the bore axially toward an opposite downstream end of the bore, and the bore then is abruptly reduced to a smaller second inside diameter so as to define a step having an axially upstream-facing step surface;

a compressor comprising a compressor housing and a compressor wheel mounted therein and connected to the rotatable shaft;

a center housing connected between the compressor housing and the turbine housing;

a variable-nozzle assembly comprising an insert having a tubular portion received into the bore of the turbine housing and having a nozzle portion extending radially out from one end of the tubular portion, an opposite end of the tubular portion defining an axially downstream-facing end face proximate but spaced from the step surface of the bore, the variable-nozzle assembly further comprising an annular nozzle ring axially spaced from the nozzle portion and an array of vanes circumferentially spaced about the nozzle ring and rotatably mounted to the nozzle ring such that the vanes are variable in setting angle for regulating exhaust gas flow to the turbine wheel;

a sealing ring disposed between the end face of the tubular portion of the insert and the step surface of the bore, the sealing ring comprising an annular body having a U- or V-shaped cross-section oriented such that an open side of the U- or V-shaped cross-section faces in a radial direction, the U- or V-shaped cross-section defining two opposing legs, one of the legs being engaged against the end face of the tubular portion of the insert and the other leg being engaged against the step surface of the bore, wherein the sealing ring is resiliently deformable and is structured and arranged so as to be axially compressed between the end face of the tubular portion of the insert and the step surface of the bore;

a heat shield compressed between the nozzle ring and the center housing, such that the heat shield and the sealing ring exert axially oppositely directed biasing forces on the variable-nozzle assembly; and a retainer ring having a radially outer portion engaged against an axially downstream-facing surface of the center housing and a radially inner portion engaged against an axially downstream-facing surface of the nozzle ring, the retainer ring urging the nozzle ring against the biasing force exerted by the heat shield.

3. The turbocharger of claim 1, wherein the nozzle ring is rigidly connected to the nozzle portion of the insert.

4. The turbocharger of claim 1, wherein the heat shield comprises a sheet metal part that is generally annular and has a radially outer portion engaged against an axially upstream-facing surface of the nozzle ring and a radially inner portion engaged against an axially downstream-facing surface of the center housing.

5. The turbocharger of claim 1, wherein the open side of the U- or V-shaped cross-section of the sealing ring faces radially outwardly.

6. A turbocharger having a variable-nozzle turbine, comprising:

a turbine comprising a turbine housing and a turbine wheel mounted therein and connected to a rotatable shaft, the turbine housing defining a chamber surrounding the turbine wheel for receiving exhaust gas, and an axially extending bore through which exhaust gas is discharged after passing through the turbine wheel, the bore being stepped such that the bore has a first inside diameter for a predetermined distance from an upstream end of the bore axially toward an opposite downstream end of the bore, and the bore then is abruptly reduced to a smaller second inside diameter so as to define a step having an axially upstream-facing step surface;

a compressor comprising a compressor housing and a compressor wheel mounted therein and connected to the rotatable shaft;

a center housing connected between the compressor housing and the turbine housing;

a variable-nozzle assembly comprising an insert having a tubular portion received into the bore of the turbine housing and having a nozzle portion extending generally radially out from one end of the tubular portion, an opposite end of the tubular portion defining an axially downstream-facing end face proximate but spaced from the step surface of the bore, the variable-nozzle assembly further comprising a generally annular nozzle ring axially spaced from the nozzle portion and an array of vanes circumferentially spaced about the nozzle ring and rotatably mounted to the nozzle ring such that the vanes are variable in setting angle for regulating exhaust gas flow to the turbine wheel;

a sealing ring disposed between the end face of the tubular portion of the insert and the step surface of the bore, the sealing ring comprising a generally annular body having a generally U- or V-shaped cross-section oriented such that an open side of the U- or V-shaped cross-section faces in a radial direction, the U- or V-shaped cross-section defining two opposing legs, one of the legs being engaged against the end face of the tubular portion of the insert and the other leg being engaged against the step surface of the bore, wherein the sealing ring is resiliently deformable and is structured and arranged so as to be axially compressed between the end face of the tubular portion of the insert and the step surface of the bore;

a heat shield compressed between the nozzle ring and the center housing, such that the heat shield and the sealing ring exert axially oppositely directed biasing forces on the variable-nozzle assembly, wherein the heat shield comprises a sheet metal part that is generally annular and has a radially outer portion engaged against an axially upstream-facing surface of the nozzle ring and a radially inner portion engaged against an axially downstream-facing surface of the center housing; and a resilient radially-compressible locator ring disposed between a radially inward-facing surface of the nozzle ring and a radially outward-facing surface of the center housing and engaged against said inward- and outward-facing surfaces so as to radially locate the nozzle ring with respect to the center housing.

7. The turbocharger of claim 6, wherein the locator ring comprises a generally annular body having a generally C-shaped cross-section that defines a radially outer leg and a radially inner leg, the radially outer leg engaged against the radially inward-facing surface of the nozzle ring and the radially inner leg engaged against the radially outward-facing surface of the center housing.

* * * * *